United States Patent [19]

Baden

[11] Patent Number: 5,504,913

[45] Date of Patent: Apr. 2, 1996

[54] QUEUE MEMORY WITH SELF-HANDLING ADDRESSING AND UNDERFLOW

[75] Inventor: Eric A. Baden, Saratoga, Calif.

[73] Assignee: Apple Computer, Inc., Cupertino, Calif.

[21] Appl. No.: 883,314

[22] Filed: May 14, 1992

[51] Int. Cl.[6] .................................. G06F 5/00; G06F 5/01
[52] U.S. Cl. ....................... 395/800; 365/78; 364/238.6; 364/238.7; 364/DIG. 1; 364/965.7; 364/DIG. 2; 364/965.4; 395/427; 395/250
[58] Field of Search .................................... 395/250, 425, 395/800; 365/78

[56] References Cited

U.S. PATENT DOCUMENTS

| | | | |
|---|---|---|---|
| 3,629,857 | 12/1971 | Faber | 340/172.5 |
| 3,699,535 | 10/1972 | Klein | 395/800 |
| 4,423,482 | 12/1983 | Hargrove et al. | 364/200 |
| 4,507,760 | 3/1985 | Fraser | 365/221 |
| 4,616,338 | 10/1986 | Helen et al. | 364/900 |
| 4,622,631 | 11/1986 | Frank et al. | 364/200 |
| 4,682,284 | 7/1987 | Schrofer | 364/200 |
| 4,819,201 | 4/1989 | Thomas et al. | 364/900 |
| 4,829,475 | 5/1989 | Ward et al. | 365/78 |
| 5,016,221 | 5/1991 | Hamstra | 365/221 |
| 5,027,330 | 6/1991 | Miller | 365/239 |
| 5,220,529 | 6/1993 | Kohiyama et al. | 365/189.01 |
| 5,224,093 | 6/1993 | Denzel et al. | 370/60 |

FOREIGN PATENT DOCUMENTS 1525045  9/1978  United Kingdom .

OTHER PUBLICATIONS

Neil Dale, Pascal Plus Data Structures, Algorithms and Advanced Programming 1988 pp. 183–186.

Leo J. Scanlon, The 68000: Principles and Programming, 1981 147–160.

Primary Examiner—Thomas C. Lee
Assistant Examiner—D. Dinh
Attorney, Agent, or Firm—V. Randall Gard

[57] ABSTRACT

The present invention reduces the overhead commonly associated with computer queues by not requiring direct addressing of each location in the queue and by not requiring specialized underflow logic. Furthermore, reads and writes to the computer queue of the present invention can be asynchronous. Lastly, the computer queue of the present invention requires less circuitry and is thus physically smaller, requires less power to operate and can operate more quickly than can queues of the prior art.

15 Claims, 10 Drawing Sheets

QUEUE MEMORY WITH SELF-HANDLING ADDRESSING AND UNDERFLOW

FIELD OF THE INVENTION

The present invention relates to the field of computer memory methods and apparatuses. More specifically, the present invention relates to an improved queueing method and apparatus with self addressing and underflow handling capability.

BACKGROUND OF THE INVENTION

Queues are waiting lines for items to be serviced. Forming queues in the real world (e.g., standing in line at a bank) is a simple matter. However, forming queues in the world of computers is a more complex matter.

Numerous issues must be addressed in the typical computer queue. The entry of items (writing to the queue) must be carefully monitored to prevent overflowing the capacity of the computer queue. The removal of items (reading from the queue) must be carefully monitored to prevent removing non-existent, invalid or out-of-date items (a condition known as "underflow"). Furthermore, the location of each item's position in the queue must be tracked or addressed. Tracking each item's position in the queue tells where to place the next item to be added to the queue or where to remove the next available item from the queue. Stated differently, the head (where the next available item in the queue is to be removed) or the tail (where the next item to be added is to be placed in the queue) of the queue must be addressed every time an item is added to or removed from the queue.

In the typical computer queue, specialized hardware and/or software handles the overflow, underflow and addressing issues explained above. In contrast, the present invention reduces the overhead commonly associated with computer queues by not requiring direct addressing of each location in the queue and by not requiring specialized underflow logic. Furthermore, with the computer queue of the present invention, reads and writes to the queue can be asynchronous. Lastly, the computer queue of the present invention requires less circuitry and is thus physically smaller, requires less power to operate and can operate more quickly.

SUMMARY AND OBJECTS OF THE INVENTION

An objective of the present invention is to provide an improved technique for handling a computer queue memory.

An objective of the present invention is to provide an improved apparatus for a computer queue memory.

The foregoing and other advantages are provided by an improved method of handling a computer queue memory, said improved computer queue memory handling method comprising the steps of: i) writing to said computer queue memory by checking whether said computer queue memory is full and if said computer queue memory is not full then applying data to said computer queue memory and issuing a write signal to said computer queue memory; and ii) reading from said memory by reading data from said memory and if said read data is valid then issuing a read signal to said computer queue memory.

The foregoing and other advantages are provided by an improved computer queue memory comprising: a) a register file, said register file comprising a matrix of rows and columns of transparent latches wherein each said column of transparent latches comprises a word of said queue memory and wherein each said row of transparent latches comprises a bit of each said word of said queue memory; b) a write addressing shift register, said write addressing shift register comprising a series of flip-flops, each said write addressing series flip-flop coupled to address one column of said columns of transparent latches of said register file; and, c) a read addressing shift register and a read addressing shift register cycle indicator, said read addressing shift register comprising a series of flip-flops, each said read addressing series flip-flop coupled to select the output of one transparent latch of a first predetermined set of outputs of each said row of transparent latches of said register file and also coupled to select the output of one transparent latch of a second predetermined set of outputs of each said row of transparent latches of said register file, said read addressing shift register cycle indicator coupled to select between said predetermined sets of outputs of each said row of transparent latches of said register file.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
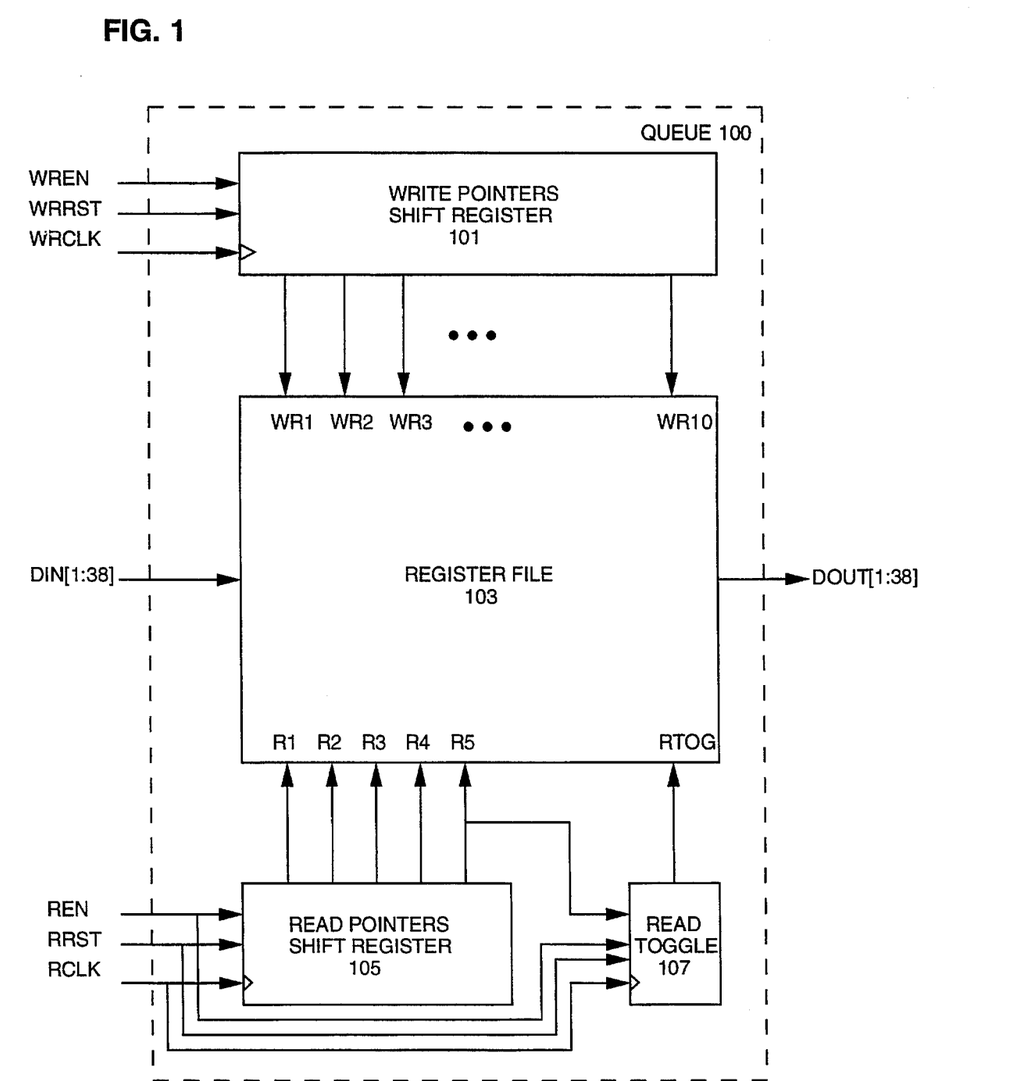
FIG. 1 is a block diagram of the computer queue of the present invention.

The present invention generally involves an improved queue 100 with self-handling addressing and underflow. Referring now to FIG. 1, a generalized block diagram of queue 100 of the present invention can be seen. Queue 100 includes Write Pointers Shift Register (WPSR) 101, Register File (RF) 103, Read Pointers Shift Register (RPSR) 105 and Read Toggle 107, each of which is explained more fully below.

Write inputs to queue 100 include Write Enable (WREN), Write Reset (WRRST), Write Clock (WRCLK) and Data In (DIN) lines one through 38. Read inputs to queue 100 include Read Enable (REN), Read Reset (RRST), Read Clock (RCLK) and Data Out (DOUT) lines one through 38. Writing to queue 100 is a simple matter of issuing a WREN signal along with the data to be written. Reading from queue 100 is a simple matter of issuing a REN signal and receiving the data from queue 100. Each of these operations is explained more fully below.

Figure 2:
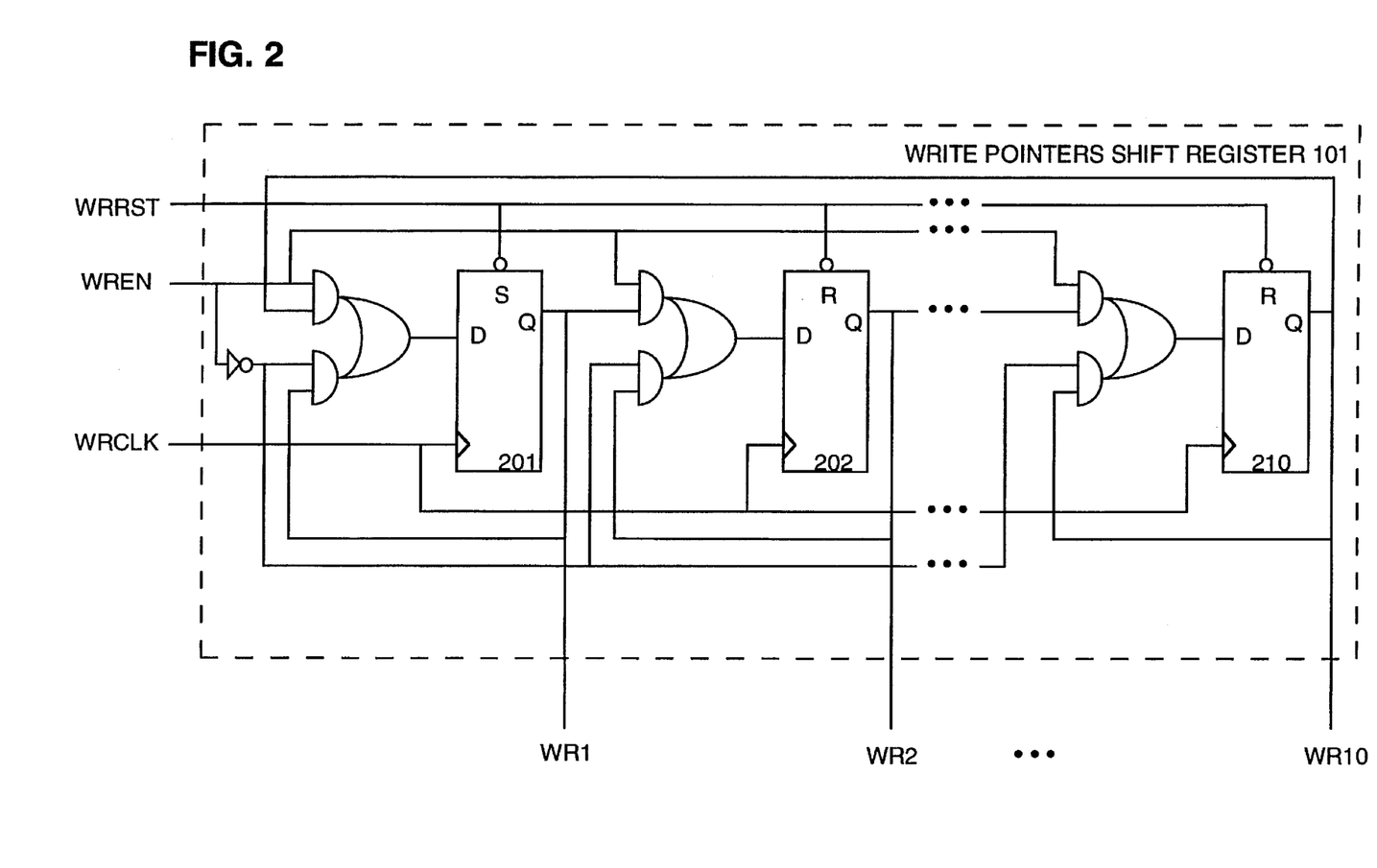
FIG. 2 is a logic diagram of the write pointers shift register of the present invention.

WPSR 101 of the present invention will now be more fully explained with reference to FIG. 2. As can be seen in the figure, WPSR 101 receives as inputs WRRST, WREN and WRCLK and provides select lines WR1 through WR10 to RF 103. Thus, WPSR 101 provides the write addressing signals to queue 100. In the preferred embodiment of the present invention, WPSR 101 provides this addressing capability via shift register logic of successive flip-flops, as will now be explained.

Upon receiving a WRRST signal, the first flip-flop (flip-flop 201) of WPSR 101 is set to a logical one while each subsequent flip-flop (flip-flops 202–210) of WPSR 101 is reset to a logical zero. Because the outputs of flip-flops 201–210 drive select lines WR 1-WR 10, flip-flops 201–210 handle the write addressing to queue 100. Driving WR1 high provides the address to (selects) the first location in queue 100 (which, as is explained below, is the first word of RF 103). Following the WRRST signal, the first WREN signal can be issued along with the data to be entered into queue 100. The WREN signal latches (via the WR signal) the input data into the word in RF 103 selected by the high WR signal line of WPSR 101. Furthermore, as is explained below, the WREN signal sets a valid data bit for the entered word.

When the first WREN signal completes, the input to the next flip-flop (flip-flop 202) of WPSR 101 goes high due to the combination of the WREN signal and the output of the previous flip-flop (flip-flop 201). This causes the output of flip-flop 202 to go high (a logical one) which thus selects the next word in RF 103 via WR2. In this way, each successive WREN signal raises the output of the next flip-flop which thus selects the next word in RF 103 via the WR select lines. Furthermore, the combination of the previous flip-flop (flip-flop 201) being high and the WREN signal again going low, which gets inverted to a high state, causes the output (WR1) of the previous flip-flop (flip-flop 201) to return to a low state. In this way, as the next flip-flop goes high (to thus select the next word in RF 103), the previous flip-flop goes low (to thus deselect and latch the previous word in RF 103). Note that this sequence continues throughout WPSR 101 and rotates from the last flip-flop (flip-flop 210) back to the first flip-flop (flip-flop 201).

Figure 3:
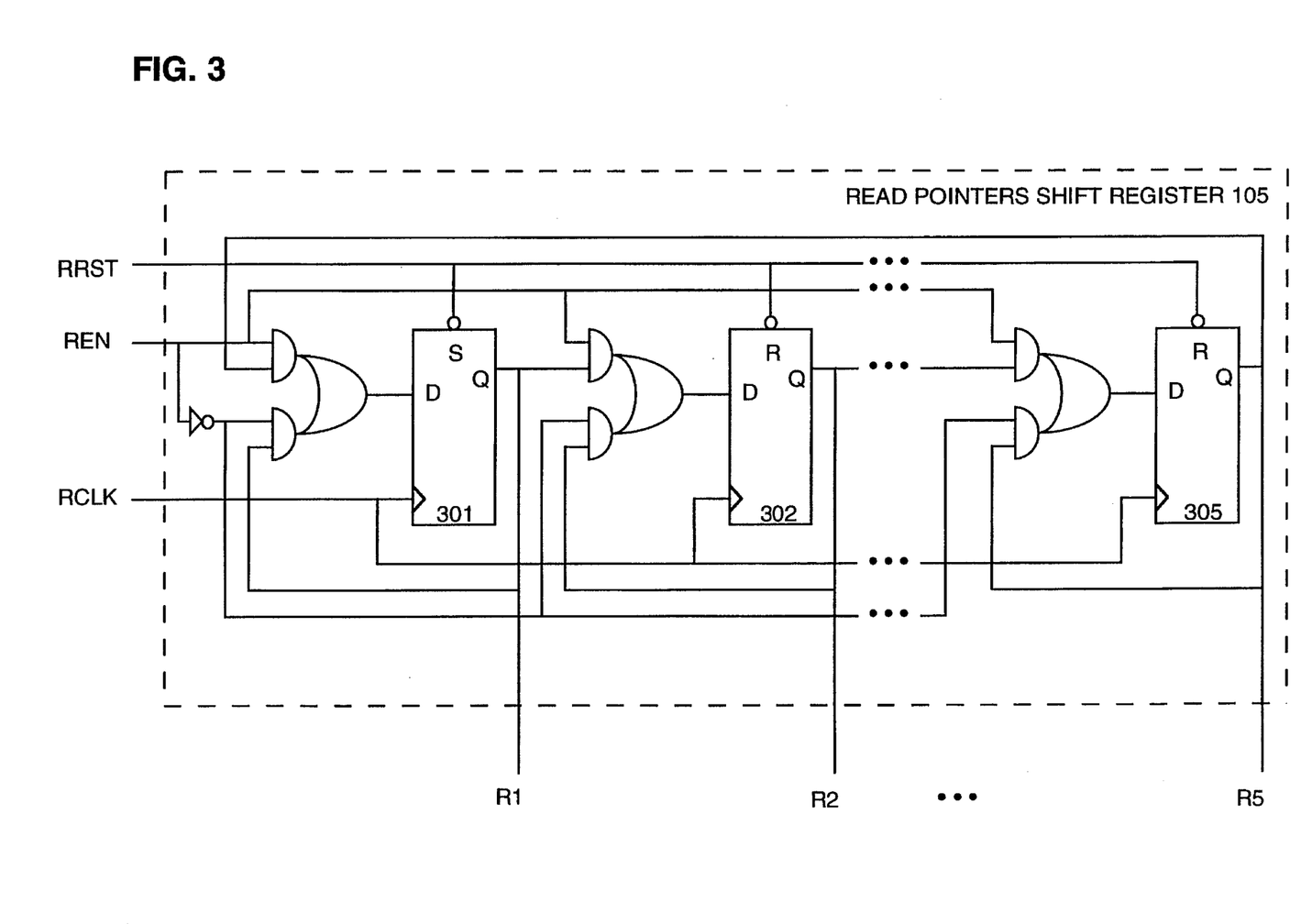
FIG. 3 is a logic diagram of the read pointers shift register of the present invention.

Referring now to FIG. 3, RPSR 105 of the present invention will now be explained. As can be seen in the figure, RPSR 105 receives as inputs RRST, REN and RCLK and provides select lines R1 through R5 to RF 103. Thus, RPSR 105 provides the read addressing to queue 100. In the preferred embodiment of the present invention, RPSR 105 provides this addressing capability via shift register logic of successive flip-flops as was explained above with reference to FIG. 2.

Figure 4:
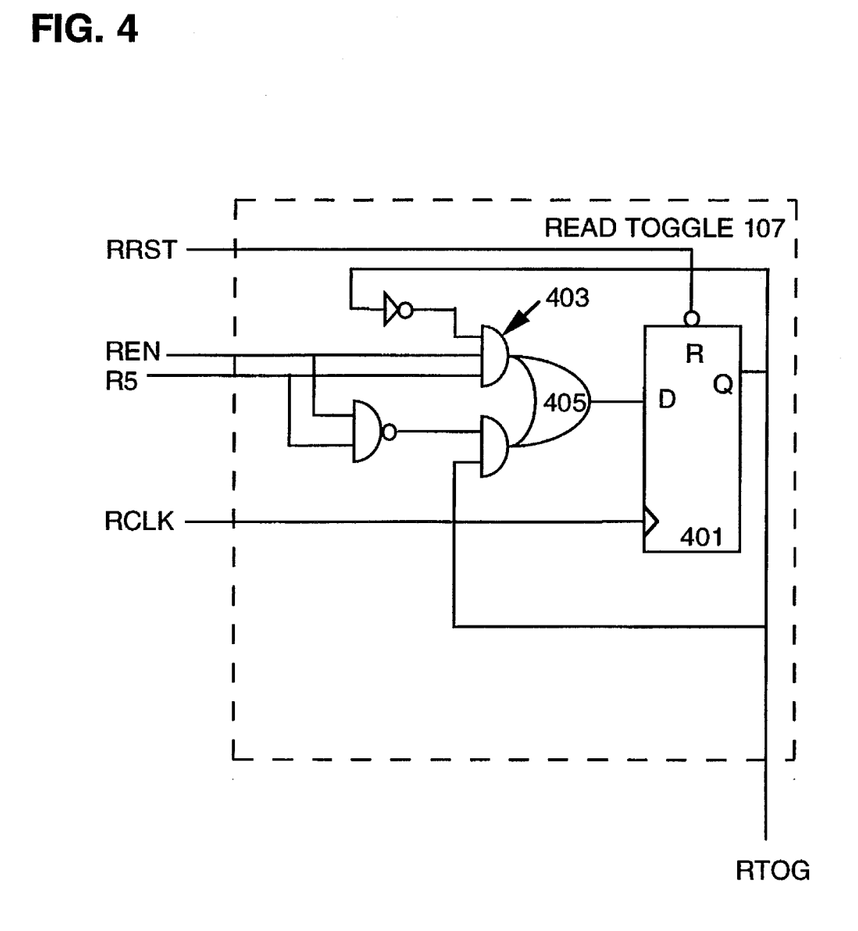
FIG. 4 is a logic diagram of the read toggle logic of the present invention.

Referring now to FIG. 4, Read Toggle 107 will now be explained. Read Toggle 107 provides a multiply or carry capability to RPSR 105. In other words, Read Toggle 105 determines whether each successive rotation through RPSR 105 is a first pass (equivalent to a "low order") or a second pass (equivalent to a "high order") in the rotation through the shift register logic of flip-flops 301–305 of RPSR 105. Stated differently, Read Toggle 107 indicates which cycle or pass through RPSR 105 is occurring at any point in time.

Read Toggle 107 receives as inputs RRST, REN, RCLK and select line R5 from RPSR 105 and provides as an output read toggle signal RTOG. As can be seen by one of ordinary skill in the art viewing the logic of Read Toggle 107, RTOG remains low as long as R5 remains low. However, once R5 goes high and REN goes high, then the inverted low RTOG signal output from flip-flop 401 combines to raise AND gate 403 high thus driving OR gate 405 high thus raising RTOG high. In this way, while the high outputs R1–R5 of flip-flops 301–305 of RPSR 105 are rotating from the last flip-flop (R5 and flip-flop 305) back to the first flip-flop (R1 and flip-flop 301) RTOG goes from a low state to a high state. Thus, as was stated above, a "high order" or second pass indication is provided. Similarly, when R5 and REN again both go high and with RTOG high, flip-flop 401 of Read Toggle 107 will go low thus once again indicating a "low order" or first pass condition.

Figure 5:
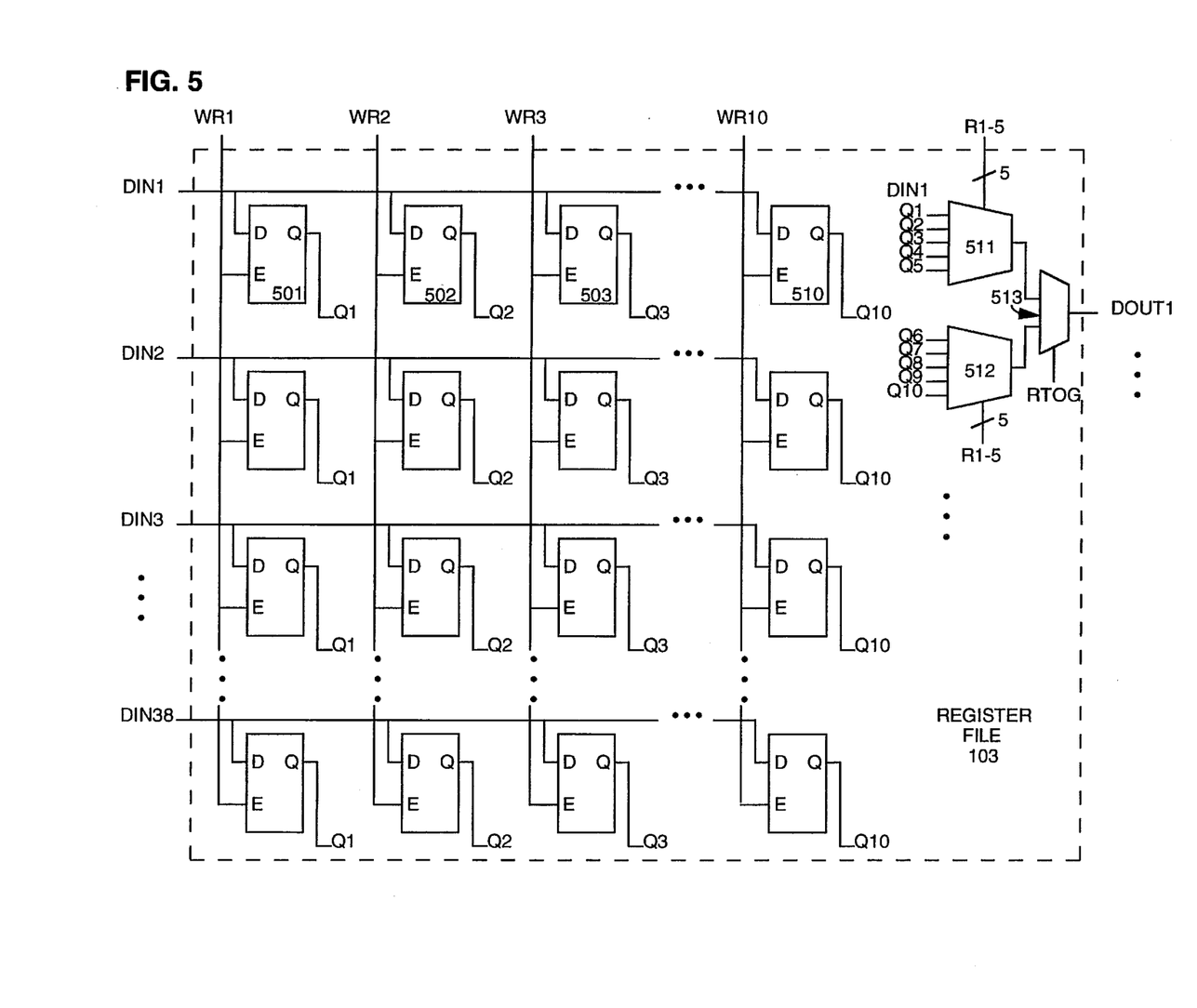
FIG. 5 is a logic diagram of the register file of the present invention.

Referring now to FIG. 5, RF 103, which contains the data of queue 100, will now be explained. RF 103 receives as input data lines DIN[1:38], select lines WR1–WR10, select lines R1–R5 and RTOG and provides as an output data lines DOUT[1:38]. As can be seen in the figure, RF 103 is a matrix of transparent latches where each column of transparent latches comprises a word (10 in the preferred embodiment of the present invention) of queue 100 and where each row of transparent latches represents one bit (38 in the preferred embodiment of the present invention) of each of the words of queue 100. As such, each transparent latch of RF 103 receives as an input one bit via DIN lines one through 38 and provides as an output one bit via DOUT lines one through 38 (via output multiplexing, as is explained below). Furthermore, each transparent latch in the RF 103 matrix receives one of the WR1–WR10 select lines as an enable signal.

Writing to RF 103 (that is, writing to queue 100) occurs by inputting data on DIN[1:38] and having one of the select (enable) lines WR1–WR10 high, as was explained above with reference to FIG. 2. The one high select line of WR1–WR10 enables the transparent latch of each bit of that word of queue 100 for data input and latching via data lines DIN[1:38].

Because each transparent latch in a given row of queue 100 represents the same bit (1–38) of each of the words (1–10) of queue 100, the read select lines R1–R5 (along with the RTOG signal) determine which one of the 10 words are read at any given time. The output multiplexing shown to the right in FIG. 5 depicts this selection process (note that the output multiplexing shown in FIG. 5 is duplicated to match the number of bits per word of queue 100; a total of 38 in the preferred embodiment of the present invention). The first 5 transparent latches in a given row (e.g., 501–505; Q1–Q5) is input to a first output multiplexer 511 and the second 5 transparent latches in a given row (e.g., 506–510; Q6–Q10) is input to a second output multiplexer 512. First output multiplexer 511 and second output multiplexer 512 each output one of its 5 inputs (Q1–Q5 and Q6–Q10, respectively) based on the select signals R1–R5. The output of first output multiplexer 511 and the output of second output multiplexer 512 are each input to a third output multiplexer 513 which then outputs one bit of DOUT based on the high order versus low order select signal RTOG. In this way, each bit of a given word is selected and output (read) from RF 103 of queue 100.

Furthermore, in the preferred embodiment of the present invention, one bit of each word of RF 103 is used to indicate whether the data contained in that word is valid, as was stated above. In the preferred embodiment of the present invention, DOUT38 is the valid bit and DOUT38 high indicates a valid word while DOUT38 low indicates an invalid word. Setting the transparent latches in RF 103 which drive DOUT38 high or low is explained more fully below with reference to FIG. 7.

Figure 6:
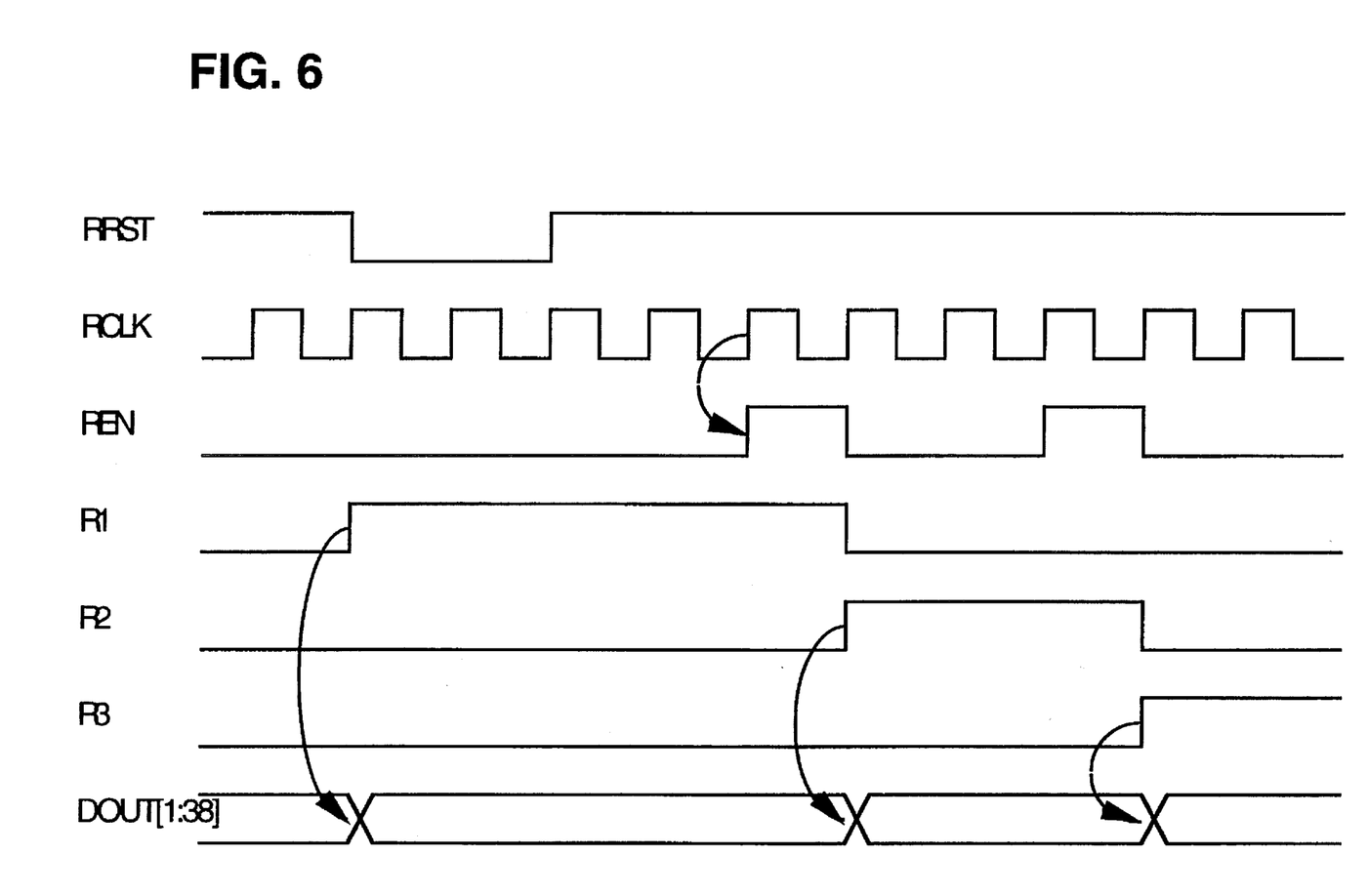
FIG. 6 is a timing diagram of a read reset and read operations of the present invention.

Referring now to FIG. 6, a typical read sequence will now be explained. After RRST is taken low and then high again (to initially reset RPSR 105 which takes R1 high which thus selects the first word in RF 103), RF 103 can be read. Stated simply, reading queue 100 is as simple as reading data off data lines DOUT[1:38] because no external addressing of queue 100 need be performed in the present invention. After the data is read from DOUT[1:38], in the preferred embodiment of the present invention, DOUT38 (the data valid bit) is then checked to ensure that the data just read is valid. If DOUT38 is low then the data is invalid (an underflow condition) and should not be relied upon. Conversely, if DOUT38 is high then the data is valid. After determining that the data is valid, a REN signal is issued. REN, as can be seen in the figure and as was explained above with reference to FIGS. 3 and 4, causes the next word in RF 103 to be selected which thus readies queue 100 for another read sequence.

Figure 7:
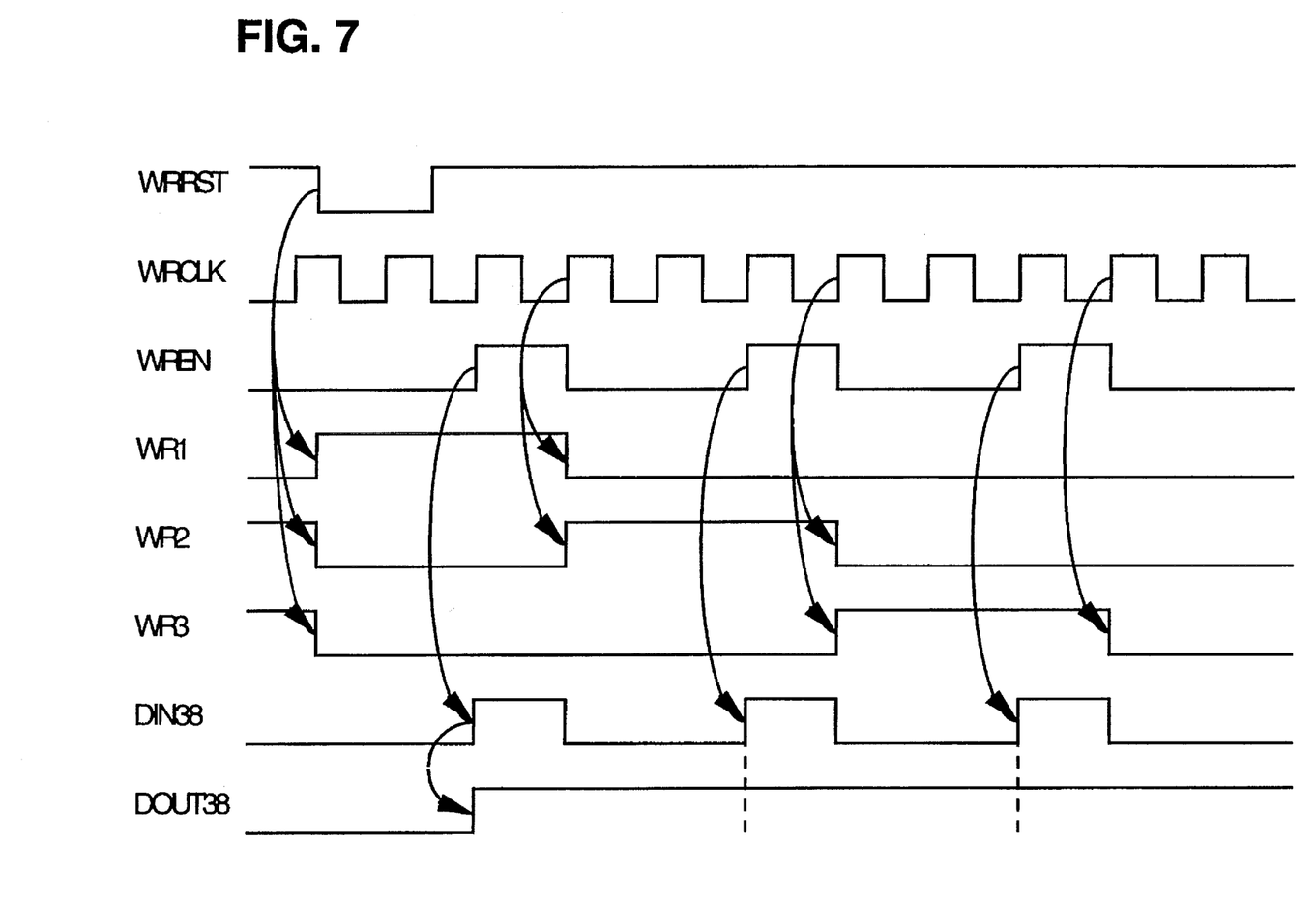
FIG. 7 is a timing diagram of a write reset and write operations of the present invention.

Referring now to FIG. 7, a typical write sequence will now be explained. After the WRRST signal has reset WPSR 101 (which takes WR1 high thus selecting the first word of RF 103 for writing), a write operation may be performed. Before writing to queue 100, RF 103 must be checked to determine if there is room to write more data into RF 103 (checking for an overflow condition). Note that the overflow logic is explained more fully below. Once it is determined that there is room in RF 103 for another word of data (no overflow condition exists) data may immediately be input to RF 103 via data input lines DIN[1:38]. In the preferred embodiment of the present invention DOUT38 is used as a valid data bit as was explained above. Therefore, DIN38 should not be taken high before the WREN signal is taken high to ensure that the high/valid DOUT38 condition only exists after the WREN signal rises. In this way, when WREN rises and WR falls the data input to DIN[1:38], including the high valid data bit DIN38, is latched into RF 103. Furthermore, as was explained above with reference to FIG. 2, the next word in RF 103 is selected/enabled by the WREN signal thus readying queue 100 for another write sequence. Additionally, DOUT38 of the next word in RF 103 is reset to a low condition because DIN38 is low when that next word's WR[1:10] signal line is taken high. In this way, the valid bit gets set for the word being written to and the valid bit is reset for the next word which will be written to.

Figure 8:
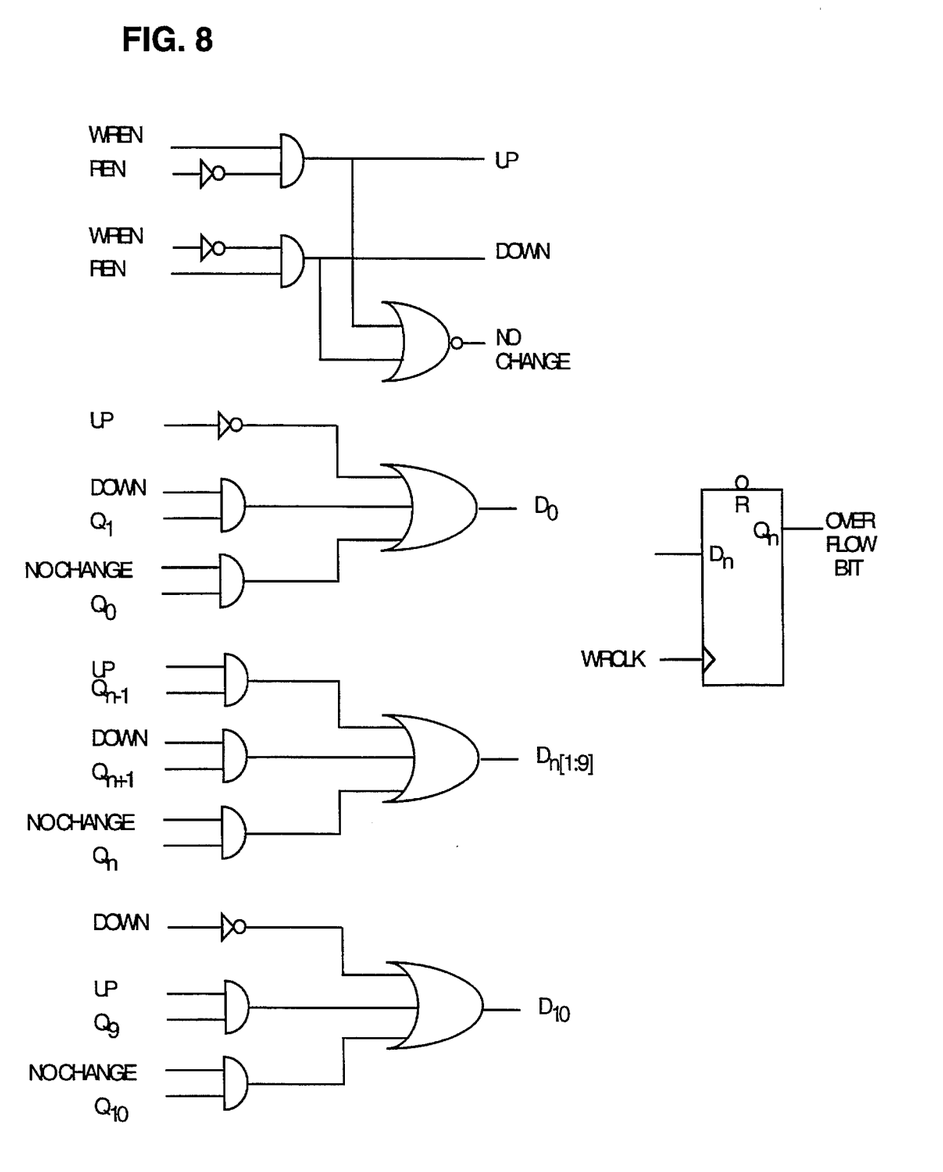
FIG. 8 is a logic diagram of a portion of the overflow logic of the present invention.

Referring now to FIG. 8, the overflow logic of the present invention will now be explained. The overflow logic, which indicates when queue 100 is full, is primarily comprised of a series of flip-flops in a shift register arrangement. The operation of the series of flip-flops is such that the first flip-flop outputs a high state upon reset (the reset signal is coupled to a SET input on the first flip-flop whereas the reset signal is coupled to a RESET input on each of the remaining flip-flops of the overflow logic) and each subsequent write operation (via the WREN signal) shifts the high state to the next flip-flop while each subsequent read operation (via the REN and REN$_{overflow}$ signals as is explained below) shifts the high state to the previous flip-flop. In this way, not only can a full queue 100 condition be sensed but also the exact number of available words can be determined. The output of the last flip-flop of the overflow logic indicates a queue 100 full condition while the output of each previous flip-flop indicates a condition where queue 100 has room for one more word. This can be particularly useful when, for instance, four words are to be written to queue 100 in a consecutive or burst fashion. In that case, the output of the last flip-flop is checked for an overflow condition plus each preceding flip-flop until the desired number (four in this example) of words is determined to be available. Because there are a total of n+1 flip-flops in the overflow logic for n words in RF 103, in the preferred embodiment of the present invention there are 11 flip-flops.

According to the desired results stated above, the truth table for the overflow logic shift register is as follows:

|  | WREN | REN$_{overflow}$ |
|---|---|---|
| Move Right/UP | 1 | 0 |
| Move Left/DOWN | 0 | 1 |
| Do Nothing/NO CHANGE | 0 | 0 |
| Do Nothing/NO CHANGE | 1 | 1 |

FIG. 8 depicts the logic for the above logical conditions where 803 generates the UP/DOWN/NO CHANGE conditions based upon the WREN and REN$_{overflow}$ input signals. FIG. 8 further depicts the logic for the above conditions where 805 generates the input, (D$_0$ in the preferred embodiment) for the first flip-flop, 807 generates the input (D$_n$[1:9] in the preferred embodiment) for each subsequent flip-flop up to but not including the last flip-flop, and 809 generates the input (D$_{10}$ in the preferred embodiment) for the last flip-flop. Lastly, FIG. 8 depicts a flip-flop 801 for the series of flip-flops in a shift register arrangement of the overflow logic whereby D$_n$ is the input from one of the logic arrangements 805, 807 or 809, Q$_n$ is the output to the logic arrangements of 805, 807, and/or 809 (and which indicates the overflow status of RF 103) and WRCLK indicates that the overflow logic is driven by the write clock.

Figure 9:
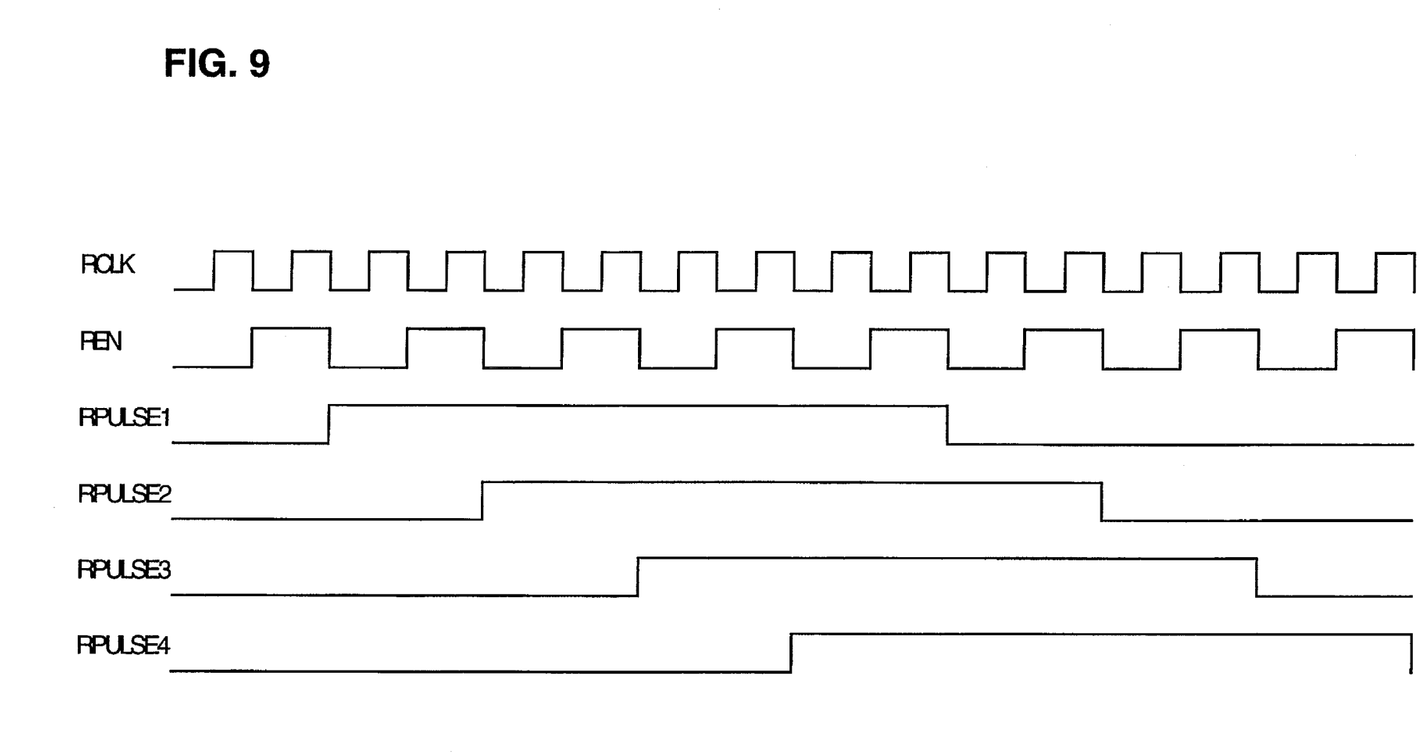
FIG. 9 is a timing diagram of the overflow logic of the present invention.
Figure 10:
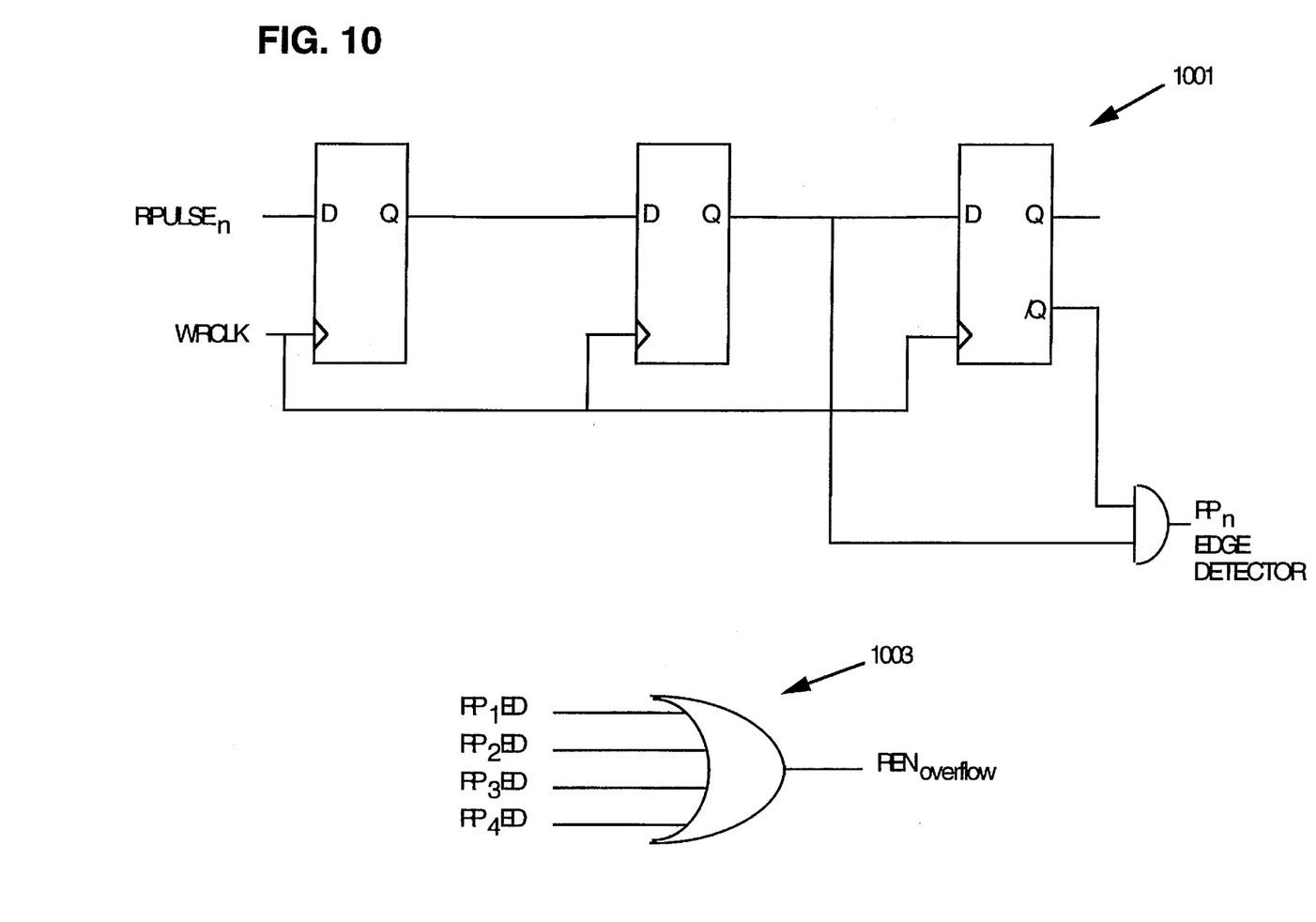
FIG. 10 is a logic diagram of another portion of the overflow logic of the present invention.

Note that because queue 100 can handle asynchronous reads and writes the overflow logic of FIG. 8 may not be able to directly input the REN signal. To address this, synchronization logic as shown in FIG. 10 is used. Referring first to FIG. 9, a succession of read signals REN can be seen. Because in the preferred embodiment of the present invention burst writes (wherein four consecutive writes are issued to queue 100) are performed, then only one burst write can be performed for every four reads. As such, a Read Pulse (RPULSE) signal is generated for every four successive REN signals. This is shown in the figure as RPULSE[1:4]. The logic to generate the RPULSE signals can be depicted as:

RPULSE0=REN AND ((RPULSE3 OR (/RPULSE0 AND/RPULSE1 AND /RPULSE2 AND/RPULSE3)) OR (RPULSE0 AND/(RPULSE1 AND REN)));

RPULSE1=REN AND (RPULSE0 OR (RPULSE1 AND/ (RPULSE2 AND REN)));

RPULSE2=REN AND (RPULSE1 OR (RPULSE2 AND/ (RPULSE3 AND REN)));

RPULSE3=REN AND (RPULSE2 OR (RPULSE3 AND/ (RPULSE0 AND REN))).

Referring now to FIG. 10, shift register logic 1001 inputs RPULSE$_n$ and generates Read Pulse n Edge Detector (RPnED). Because shift register logic 1001 is duplicated four times (one for each word in the four word burst writes of the preferred embodiment), there are four RPnED signals generated. The RPnED signals are input to an OR gate, as is indicated by reference number 1003 in the figure, to generate the REN$_{overflow}$ signal which is used by the overflow logic of FIG. 8.

In the foregoing specification, the invention has been described with reference to a specific exemplary embodiment and alternative embodiments thereof. It will, however, be evident that various modifications and changes may be made thereto without departing from the broader spirit and scope of the invention as set forth in the appended claims.

The specification and drawings are, accordingly, to be regarded in an illustrative rather than a restrictive sense.

What is claimed is:

1. An improved computer queue memory comprising:
   a) a register file, said register file comprising a matrix of rows and columns of transparent latches wherein each said column of transparent latches comprises a word of said queue memory and wherein each said row of transparent latches comprises a bit of each said word of said queue memory;
   b) a write addressing shift register, said write addressing shift register comprising a series of flip-flops, each said write addressing flip-flop coupled to address one column of said columns of transparent latches of said register file;
   c) a read addressing shift register and a read addressing shift register cycle indicator, said read addressing shift register comprising a series of flip-flops, each said read addressing series flip-flop coupled to select the output of one transparent latch of a first predetermined set of outputs of each said row of transparent latches of said register file and also coupled to select the output of one transparent latch of a second predetermined set of outputs of each said row of transparent latches of said register file, said read addressing shift register cycle indicator coupled to select between said predetermined sets of outputs of each said row of transparent latches of said register file.

2. The improved computer queue memory of claim 1 further comprising a queue memory full shift register, said queue memory full shift register comprising a series of flip-flops, each said queue memory full flip-flop coupled to indicate a degree of fullness of said register file.

3. The improved computer queue memory of claim 2 further comprising a read/write synchronizer, said read/write synchronizer comprising a set of shift registers, each said shift register of said set of shift registers comprising a series of flip-flops.

4. The improved computer queue memory of claim 3 wherein said register file comprises ten columns of transparent latches and thirty-eight rows of transparent latches.

5. The improved computer queue memory of claim 4 wherein said write addressing shift register comprises ten flip-flops.

6. The improved computer queue memory of claim 5 wherein said read addressing shift register comprises five flip-flops.

7. The improved computer queue memory of claim 6 wherein said read addressing shift register cycle indicator comprises one flip-flop.

8. The improved computer queue memory of claim 7 wherein said queue memory full shift register comprises eleven flip-flops.

9. The improved computer queue memory of claim 8 wherein said read/write synchronizer comprises four shift registers wherein each read/write synchronizer shift register comprises three flip-flops.

10. The improved computer queue memory of claim 9 wherein said computer queue memory is a first-in-first-out queue.

11. An improved computer queue memory comprising:
   a) a register file, said register file comprising a matrix of thirty-eight rows and ten columns of transparent latches wherein each said column of transparent latches comprises a word of said queue memory and wherein each said row of transparent latches comprises a bit of each said word of said queue memory;
   b) a write addressing shift register, said write addressing shift register comprising a series of ten flip-flops, each said write addressing series flip-flop coupled to address one column of said columns of transparent latches of said register file;
   c) a read addressing shift register and a read addressing shift register cycle indicator, said read addressing shift register comprising a series of five flip-flops, each said read addressing series flip-flop coupled to select the output of one transparent latch of a first predetermined set of outputs of each said row of transparent latches of said register file and also coupled to select the output of one transparent latch of a second predetermined set of outputs of each said row of transparent latches of said register file, said read addressing shift register cycle indicator coupled to select between said predetermined sets of outputs of each said row of transparent latches of said register file;
   d) a queue memory full shift register, said queue memory full shift register comprising a series of flip-flops, each said queue memory full flip-flop coupled to indicate a degree of fullness of said register file; and,
   e) a read/write synchronizer, said read/write synchronizer comprising a set of shift registers, each said shift register of said set of shift registers comprising a series of flip-flops.

12. The improved computer queue memory of claim 11 wherein said read addressing shift register cycle indicator comprises one flip-flop.

13. The improved computer queue memory of claim 12 wherein said queue memory full shift register comprises eleven flip-flops.

14. The improved computer queue memory of claim 13 wherein said read/write synchronizer comprises four shift registers wherein each read/write synchronizer shift register comprises three flip-flops.

15. The improved computer queue memory of claim 14 wherein said computer queue memory functions as a first-in-first-out computer queue memory.

* * * * *